United States Patent [19]

Klinger

[11] 4,133,201
[45] Jan. 9, 1979

[54] TESTING APPARATUS FOR VEHICLES AXLES

[75] Inventor: Friedrich Klinger, Darmstadt-Arheilgen, Fed. Rep. of Germany

[73] Assignee: Firma Carl Schenck AG, Darmstadt, Fed. Rep. of Germany

[21] Appl. No.: 832,906

[22] Filed: Sep. 13, 1977

[30] Foreign Application Priority Data

Sep. 20, 1976 [DE] Fed. Rep. of Germany ....... 2642155

[51] Int. Cl.² ............................................. G01M 17/04
[52] U.S. Cl. ..................................... 73/12; 73/432 SD
[58] Field of Search ............... 73/432 SD, 133 R, 118, 73/669, 662, 665, 12

[56] References Cited

U.S. PATENT DOCUMENTS 3,713,330  1/1973  Lentz ................................. 73/118 UX
3,821,893  7/1974  Klinger et al. ...................... 73/669 X

FOREIGN PATENT DOCUMENTS 523160  8/1976  U.S.S.R. ................................. 73/133 R

Primary Examiner—Jerry W. Myracle
Attorney, Agent, or Firm—W. G. Fasse; D. F. Gould

[57] ABSTRACT

The present testing apparatus for vehicle axles, wheel suspensions, and similar structural components permits the applying of several forces to the test sample. The testing forces or force components are effective in different directions and may involve vertical forces, longitudinal forces, and lateral forces. The force applying elements are connectable to the test sample either in a rotatable manner or in a manner rigid against rotation. Actuating and force transmitting elements are effective at least at one force introducing point forming part of said force applying element or elements. At least one force transmitting element is not directly connected to a force introducing point, but rather, it is connected to an intermediate lever. The intermediate lever in turn may be constructed for transmitting a further force component to said force introducing point.

11 Claims, 7 Drawing Figures

4,133,201

TESTING APPARATUS FOR VEHICLES AXLES

BACKGROUND OF THE INVENTION

The present invention relates to a testing apparatus for vehicle axles, wheel suspensions, and similar structures. For testing such structural components it is desirable to introduce several forces or force components which are effective in different directions, for example, in the vertical direction, the longitudinal direction, and in the lateral direction. The longitudinal direction in this context would be the direction of vehicle movement, whereas the lateral direction would be in the direction of the longitudinal axis of the vehicle axle. These forces are applied by force applying means including force introducing elements, actuating elements and force transmitting elements. The force applying means may be connected to the respective test sample in a rigid manner or in a rotatable manner. Further, the force applying means are effective at least in one force introducing point of a force introducing element.

In the testing of vehicle axles and wheel suspensions, it is necessary that the forces and loads which occur in the actual operation of the vehicle are simulated as close to actuality as possible and that the simulated forces are applied to the test sample also substantially in the same manner as happens in the operation of the vehicle. The forces to be simulated result normally from the forces which occur in the point of contact between the vehicle wheel and the road surface. These forces involve, in addition to the force resulting from the vehicle weight and load, which is effective in the vertical direction, the horizontal breaking forces and acceleration forces extending in the plane defined by the vehicle wheel. These forces further involve longitudinal and vertical forces resulting from holes and bumps in the road surface, as well as lateral forces extending substantially perpendicularly to the plane of the vehicle wheel. Such lateral forces may, for example, be effective on the vehicle wheel when the vehicle negotiates a curve.

The forces to be simulated by the testing apparatus are normally generated by hydraulic load piston cylinder devices which are connected to the test sample by means of suitable linkage and force introducing elements. The force introducing elements may be secured in a rotatable manner to the vehicle axle, whereby no torque moments may be applied to the axle. The force introducing elements may also be connected to the vehicle axle in a rigid manner, whereby force components effective perpendicularly to the vehicle axle result in respective torque moments. It is possible to simulate any desired loads, especially also dynamic loads, by means of servo-hydraulic control and regulating devices. Reference is made in this context to a prior art article entitled "Multi-Axial Servo Hydraulic Testing Devices For Vibration Strength Investigations On Motor Vehicle Axles", published in ATZ (Automobiltechnische Zeitschrift), Volume 4, 1972, pages 139–145, by Friedrich Klinger and Rolf Ross.

For the complete simulation of all essential forces and moments which may occur on a vehicle wheel the following force components are necessary:

(1) a vertical force,
(2) a longitudinal force effective at a point on the circumference of the wheel,
(3) a lateral force effective at a point on the circumference of the wheel, and
(4) a longitudinal force effective at the axial stud or journal.

However, heretofore it was deemed to be satisfactory that only three forces or rather, force components, are simulated on testing devices for vehicle axles. This has been found to be inadequate. Especially in connection with axles which are subject to a steering, additional difficulties occur because the structural components to which the testing forces must be applied are constructed so as to be tiltable for following any steering motions. The difficulty arises from the fact that the actuating elements for introducing the testing forces must not hinder the steering motion. Further difficulties occur if it becomes necessary to test the vehicle axles or wheel suspensions in the installed condition in the vehicle because in this environment the chassis components or vehicle body components may interfere with the installation of the load cylinders and the actuating linkage members.

OBJECTS OF THE INVENTION

In view of the above, it is the aim of the invention to achieve the following objects, singly or in combination:

to avoid the disadvantages of prior art testing devices for vehicle wheels, more specifically, to provide a testing apparatus which is capable of applying several forces or force components in different directions, whereby such forces or force components may be transmitted to one or two force introducing elements;

to provide a testing apparatus in which the application of the testing forces or moments will not interfere with the steering motions of the elements to be tested;

to provide a testing apparatus in which the actuating piston cylinder means and actuating linkage elements may be arranged outside of the vehicle structure proper so as to be able to test a vehicle axle and/or vehicle wheel in its installed condition; and to provide a testing apparatus capable of applying or introducing four forces or force components to a steered vehicle axle.

SUMMARY OF THE INVENTION

According to the invention there is provided a testing apparatus of the type described which is characterized in that at least one force transmitting element is indirectly connected to a force introducing point by means of an intermediate lever which may be adapted to apply a further force component to the force introducing point, if desired. Due to this indirect force application according to the invention, it has now become possible to transmit two or more forces or force components to a force introducing point by structurally simple means. A special advantage is seen in that the pivot points of the force transmitting elements may be of a simple structure. Moreover, the actuating piston cylinder means and the force transmitting linkage means may be arranged outside the plane defined by the vehicle wheel, whereby it is possible to avoid any interference between the force application and the steering movements of a wheel being tested. Another advantage of arranging the actuating and force transmitting elements displaced relative to the force introducing point is seen in that the testing of vehicle assembly units becomes possible with the units assembled into the complete vehicle. This applies especially with regard to the introduction of longitudinal forces.

It is suitable to arrange the intermediate lever in such a manner that it forms an angle of about 90° with the corresponding force transmitting element. It is also advantageous to construct the intermediate lever as a force transmitting element for lateral forces, especially where two force transmitting elements are connected to one and the same intermediate lever and where the force transmitting elements are connected to the same or to different connecting points with the intermediate lever.

Another especially advantageous embodiment of the invention is seen in that two force introducing elements are arranged for cooperation with the test sample and that an intermediate lever is arranged at the force introducing point of a rotatable force introducing element, whereas a further intermediate lever is arranged at the force introducing point of a rigidly connected force introducing element. In this instance it is also possible that both intermediate levers are connected to force transmitting elements for longitudinal forces and simultaneously serve as transmitting elements for lateral forces. In this embodiment the application of lateral forces may be such that both intermediate levers are connected to a common actuating means for the transmission of said lateral forces.

In order to transmit four forces or force components onto a steerable axle, or rather steerable structural element, the invention provides that two force introducing elements are arranged for cooperation with the steerable structural components, whereby the force introducing elements have force introducing points located on the tilting axis of the steerable structural component and the intermediate levers are connected to the force introducing points.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS

Figure 1:
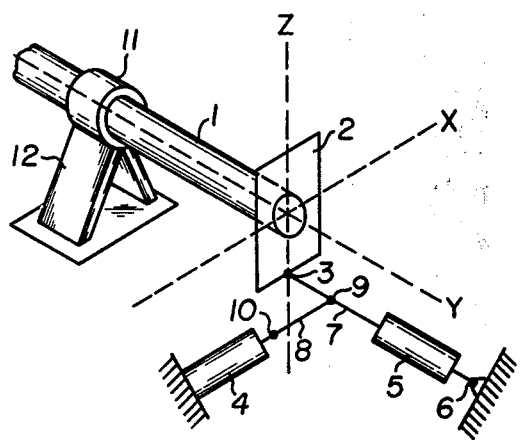
FIG. 1 illustrates an embodiment of a testing apparatus for a vehicle axle including a force introducing element arranged rigid against rotation but capable of introducing two forces.

FIG. 1 illustrates a vehicle axle 1 symbolically represented by an axle pipe. The axle may be rigid or it may present any desirable axle construction or wheel suspension, for example, including cross links or longitudinal links. The vehicle axle 1 is secured at 11 to a support structure 12 of the testing apparatus which itself is not shown in detail. Generally, the arrangement is such as it would normally occur in the connection of an axle to the vehicle chassis proper. The testing device may, for example, comprise a clamping plate or any other suitable securing device for the structural components to be tested. The testing device further comprises actuating elements such as piston cylinder means 4 and 5 as well as the securing devices which may be arranged on the clamping plate or on the floor or foundation of the testing facility. Further, the apparatus will comprise force transmitting elements for transmitting the forces or force components generated by the actuating piston cylinder means 4 and 5 to the structural components to be tested. In addition, the testing apparatus will comprise the necessary control means which are conventional. The just enumerated elements or components will be constructed and arranged with due regard to the requirements of any particular testing situation.

Figure 2:
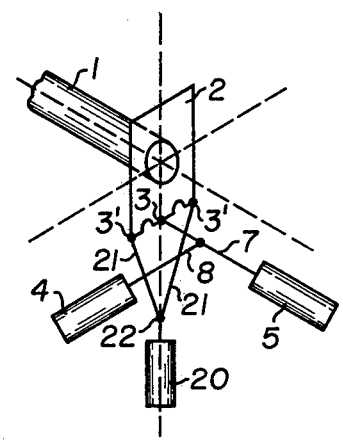
FIG. 2 illustrates an embodiment in which the force introducing element is rotatably secured to the vehicle axis and is adapted for introducing three forces.

A force introducing element 2 is arranged at the vehicle axle 1. The element 2 may be considered to represent the wheel or set of wheels and is constructed and secured to the axle in such a manner that the forces produced by the testing apparatus may be transmitted to the structural component to be tested. A force introducing element such as 2 may be secured to the axle in a manner rigid against rotation or in a rotatable manner. The rigid connection corresponds to a blocking of the wheel, for example, when applying a brake. The rotatable connection corresponds to a freely rotating wheel in actuality. In the embodiment of FIG. 2 the force introducing element 2 is rigidly secured to the axle 1, for example, to introduce brake forces to the axle.

Referring further to FIG. 1 the three space coordinates x, y, and z are indicated with dashed lines, whereby the x-coordinate represents the above defined longitudinal direction, the y-coordinate represents the lateral direction coinciding with the longitudinal axis of the axle 1, and the z-coordinate represents the vertical direction.

The force introducing element comprises a force introduction point 3 to which the forces are applied which are to be transmitted to the vehicle axle. The force introducing point 3 has a specific spacing from the coordinate origin. Such spacing should correspond to the spacing between the axle stud and the point of the wheel circumference which contacts the road surface. All essential force components and loads effective on the wheel are applied to this point. The force introducing point may be a joint, for example, a ball-joint, or it may be any other suitable hinged bearing.

As mentioned, the forces or force components to be applied to the axle to be tested are produced by the actuating piston cylinder means 4 and 5. For example, these piston cylinder means may be of the hydraulic type. The pressure supply means as well as the control of the cylinders is not illustrated since these elements are conventional and unnecessary for the understanding of the invention.

The actuating cylinders may be arranged in a rigid position as illustrated for the cylinder 4, or they may be movable as shown, for example, by means of the joint 6 through which the cylinder 5 is connected to a fixed point. As a result of the joint 6 the piston 5, or rather its longitudinal axis may freely take up any position in a plane or in space. The actuating cylinder 4 is arranged with its longitudinal axis in the x-direction and serves for applying longitudinal forces. The actuating cylinder 5 is arranged in the y-direction and produces lateral or side forces. Thus, with the apparatus of FIG. 1 two forces or force components may be transmitted to the structural component to be tested.

The forces produced by the actuating cylinders 4 and 5 are transmitted through the force transmitting elements 7 and 8 to the force introducing point 3. The force transmitting elements may, for example, be made of tubular or sectional stock or any other suitable linkage or lever means. The actuating cylinder 5 for introducing lateral forces is directly connected to the force introducing point 3 by means of the force transmitting element 7. The force transmitting element 7 is simultaneously an intermediate lever for the force transmitting element 8 of the actuating cylinder 4. The force transmitting element 8 is connected to the force transmitting element 7 in a suitable manner, for example, by a fork link or joint or by a universal joint. The force transmitting elements may include further hinging or pivoting points, for example, the pivot point 10 at the force transmitting element 8, in order to avoid any restraint in the force transmitting element when the force introducing point 3 should make any movement.

The spacing of the connecting point 9 from the force introducing point 3 may be selected at random and such spacing may, for example, be adapted to the type of structural component to be tested, or to the assembly requirements for the actuating cylinder and so forth. Generally, it would be desirable to place the connecting point 9 as close to the force introducing point 3 as possible. By such feature the transmission of too large cross forces or moments at the force transmitting element or at the intermediate lever 7 as well as at the actuating cylinder 5 is avoided. The longitudinal forces to be generated by the actuating piston cylinder 4 are adapted to the lever ratios of the intermediate lever 7 so that the desired force component is effective at the force introducing point 3.

The detailed structural features of the force introducing point 3, the connecting point 9, the pivot or joint connecting points of the actuating elements and so forth are not part of this invention and hence such details are not illustrated, especially since they are well known to those skilled in this art.

The embodiment of FIG. 2 is constructed for transmitting three forces or force components to the test sample. In addition to the longitudinal and lateral forces which are transmitted in the same manner as has been described above with reference to FIG. 1, it is possible in FIG. 2 to generate vertical forces by means of a further actuating cylinder 20. Such vertical forces are applied to the force introducing element 2 and thus to the axle 1 by means of a force transmitting element 21. The force transmitting element 21 has a forked shape and is effective on two force introducing points 3' at the force introducing element 2. By means of this type of force introducing it is possible to introduce or apply the vertical force to the force introducing element 2 separately from the other forces.

Figure 5:
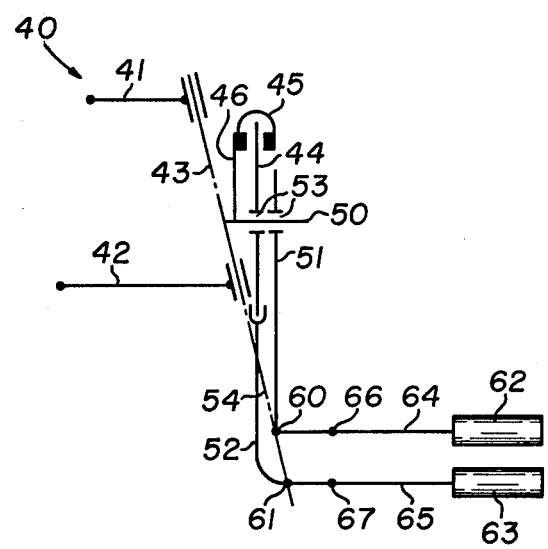
FIG. 5 is a sectional view through a testing apparatus for testing steered axles including two force introducing elements and two intermediate levers.

In the embodiment of FIG. 2 the force introducing element 2 is rotatably secured to the axle 1 to be tested. For this purpose there may, for example, be provided ball bearings 53 arranged on an axle stud 50 as schematically shown in FIG. 5 for the force introducing elements 51 and 52. Due to the rotatable supporting of the force introducing element 2 relative to the axle 1, the embodiment of FIG. 2 avoids the undesirable introduction of torque moments into the axle structure when longitudinal forces are applied in the course of the testing procedure. It is suitable to secure or support the force transmitting element 21 at the actuating cylinder 20 by means of a pivot bearing or point 22. In this manner it is avoided that the longitudinal or lateral forces are falsified which might occur where a rigid interconnection of the actuating or force transmitting elements is employed. The pivoted arrangement is also suitable for the actuating cylinders 4 and 5 or for the force transmitting elements 7 and 8 in order to avoid a restraint or binding in the force transmission and thus a falsification of the individual forces which may result from a rigid connection of the actuating or force transmitting elements.

The fork shape of the force transmitting element 21 has the advantage that it is possible to apply longitudinal forces to the axle stud even where the force introducing element 2 is rotatably secured to the axle 1. The force introducing element 2 forms together with the force transmitting element 21 a beam which is stiff against bending in the x-direction. Such bending stiff beam is supported on the axle stud 50 as shown in FIG. 5 and at the pivot point 22. Thus, a force applied at the force introducing point in the longitudinal direction is effective on the axle stud and on the pivot point 22, whereby the size of the bearing forces at the bearing points is determined by the length of the lever arms between the axle stud and the force introducing point 3 on the one hand and the axle stud and the pivot point 22 on the other hand.

The actuating piston cylinder arrangement for applying the vertical force may be arranged, contrary to the illustration in FIG. 2 and contrary to the following examples, below the actuating cylinder for the lateral force. In such an embodiment the vertical force is transmitted to the pivot point or junction 22 of the force transmitting element 21 by means of a bell crank or by means of a so-called Watt-linkage.

Figure 3:
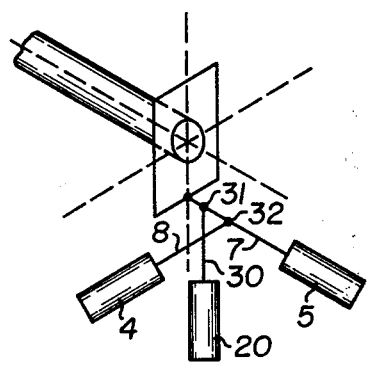
FIGS. 3 and 4 illustrate embodiments for testing vehicle axles with a force introducing element arranged rigid against rotation and capable of introducing three forces.
Figure 4:
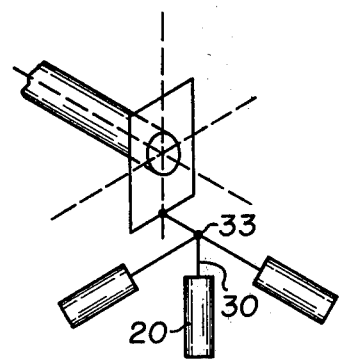

The arrangements illustrated in FIGS. 3 and 4 are constructed similar to the embodiment of FIG. 1 and also include a force introducing element secured to the axle in a manner rigid against rotation. However, in the embodiments of FIGS. 3 and 4 the force introducing elements are arranged for transmitting three forces or force components. In addition to the longitudinal and lateral forces it is possible to transmit also vertical forces by means of the actuating cylinders 20 and the force transmitting elements 30.

FIG. 3 illustrates that a force transmitting element may also be provided as an intermediate lever for the transmitting of two forces. In the illustrated example, the force transmitting element 7 for the lateral force constitutes simultaneously the intermediate lever for transmitting of vertical and longitudinal forces. The pivot or connecting points 31 and 32 of the two force transmitting elements 30 and 8, respectively, for the vertical and longitudinal force introduction, are arranged separately from each other. As shown in FIG. 4 the two pivot points may, however, also coincide with each other in a common connecting point 33. The detailed construction of the pivots or pivot bearings and of the actuating cylinder means is conventional.

Figure 6:
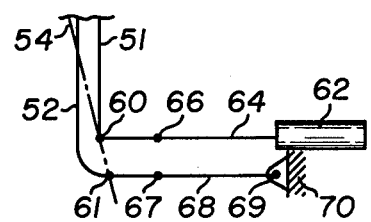
FIGS. 6 and 7 illustrate further example embodiments for the arrangement of intermediate levers in testing devices employing two force introducing elements as illustrated in FIG. 5.

In the example embodiment according to FIGS. 1–4, the intermediate lever 7 may also be connected to a fixed point of the testing apparatus and not to the actuating cylinder. Such an embodiment is illustrated by the intermediate levers 68 shown, for example, in FIG. 6. However, such an arrangement of the intermediate lever is not suitable for the transmission of a lateral force. The arrangements illustrated in FIGS. 1–4 may also be employed for the testing of steered axles. For this purpose it is merely necessary to arrange the force introducing point 3 or the pivot point 22 in FIG. 2 on the tilting axis.

FIG. 5 illustrates a steerable axle 40 having cross links 41 and 42 of unequal length and an axle leg 43. The wheels are simulated by two force introducing elements 51 and 52 rotatably secured to the axle journal 50 by means of bearings 53. The force introducing element 52 is attached to a brake disc 44 and may be blocked against rotation by actuating a brake assembly 45, whereby a connection rigid against rotation is established between the force introducing elements 52 and the axle 40 to be tested. If the force introducing element 52 is directly secured to an element rigidly secured to the axle, for example, if the element 52 is secured to the brake support 46, a connection is established between the force introducing element and the axle to be tested which is continuously rigid against rotation.

Referring further to FIG. 5, the two force introducing points 60 and 61 of the two force introducing elements 51 and 52 are located on the tilting axle 54 of the test sample. A force introducing point, for example, point 60 may be arranged in this embodiment with the same spacing to the wheel axle as the spacing between the latter and the contact point of the simulated vehicle wheel on the road. The second force introducing point, for example, 61, is arranged on the tilting axle and somewhat displaced relative to the first mentioned force introducing point to facilitate the assembly. The different spacing of the force introducing points from the vehicle wheel axle may be taken into account when computing the force introduction.

Lateral forces may be transmitted to the force introduction points 60 and 61 by means of the actuating cylinders 62 and 63 through the force transmitting elements 64 and 65, whereby the force transmitting elements 64 and 65 simultaneously serve as intermediate levers for the transmission of longitudinal forces which are introduced at the connecting points 66 and 67 and which are transmitted to the force introducing points by means of the intermediate levers. The actuating and force transmitting elements for the longitudinal forces correspond to the elements 4 and 8 illustrated in FIGS. 1-3.

Where it is necessary to transmit longitudinal forces to both force introducing elements, it is possible to arrange the actuating cylinders for such forces in the same or a similar manner as the actuating piston cylinder means 62 and 63 for the lateral forces. For example, the piston cylinder means may be arranged one below the other.

In the arrangement of FIG. 5 it is possible to transmit vertical forces, for example, by means of the force introducing element 51. The force transmission may be accomplished in this instance in a manner similar to that illustrated in FIG. 2, by means of a fork shaped force transmitting element as shown at 21 in FIG. 2. The force introducing point 61 of the force introducing element 52 may be arranged in this instance between the fork legs of the fork shaped force transmitting element, similar to the arrangement of the force introducing point 60.

The arrangement of two force introducing elements as illustrated in FIG. 5 makes it possible to generate longitudinal forces which are only effective on the axle journal or stud (according to FIG. 2) as well as brake forces and acceleration forces which apply torque moments to the axle in accordance with the arrangement of FIG. 1. Due to the application or introducing of forces or force components by means of intermediate levers as taught by the invention, it is possible, especially in connection with steerable axles to simulate in a single testing device or apparatus all forces that may occur on a vehicle axle in actual use.

The arrangement of intermediate levers as taught by the invention makes sure that the steering motions of the wheel about its tilting axis are not hindered and in addition a displacement of the effective lines of the force application is avoided. Where steering movements are involved, it is possible to compose the individual forces from force components in a manner previously proposed. Such force components are produced by rigidly arranged actuating cylinders for longitudinal and lateral forces.

The arrangement illustrated in FIG. 5 may be modified in different ways. According to FIG. 6, which illustrates the lower portion of FIG. 5 in a modified version, it is possible to transmit the entire lateral force onto one force introducing element. The actuating cylinder 62 acts in this connection through the force transmitting element or through the intermediate lever 64 only on the force introducing element 51. The force introducing element 52 does not transmit any lateral force in this modification. The force introducing point 61 of this element is connected with an intermediate lever 68 which in turn is connected to a pivot point 69 secured to a fixed member 70 of the testing apparatus. As in FIG. 5, longitudinal forces are transmitted to both force introducing elements at the connecting points 66 and 67.

Figure 7:
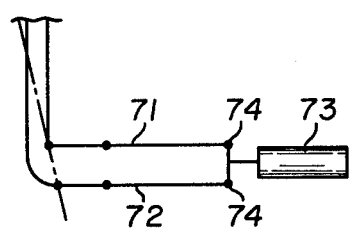

In the embodiment according to FIG. 7, both force transmitting elements or intermediate levers 71 and 72 are actuated by means of a common actuating cylinder 73, whereby the intermediate levers 71, 72 are connected to the actuating piston cylinder device 73 through pivot or journal means 74 and through suitable interconnecting elements. The remainder of the arrangement of FIG. 7 is the same as that of FIG. 5.

Although the invention has been described with reference to specific example embodiments, it will be appreciated, that it is intended, to cover all modifications and equivalents within the scope of the appended claims.

What is claimed is:

1. An apparatus for testing a structural component by applying several forces to said structural component, comprising force applying means including at least one force introducing point, actuating power means and force transmitting means operatively interconnecting said actuating power means to said force introducing point of said force applying means, lever means operatively connected to said force transmitting means and thus indirectly to said force introducing point, said apparatus further comprising further means operatively connected to said lever means for applying an additional force component to said force introducing point through said lever means, whereby two force components are simultaneously applied to said one force introducing point through said force transmitting means.

2. The apparatus of claim 1, wherein said lever means extend at an angle of about 90° relative to said force transmitting means.

3. The apparatus of claim 1, wherein said lever means is positioned to transmit lateral forces to said force introducing point.

4. The apparatus of claim 1, wherein said force transmitting means comprise force transmitting elements, said lever means being connected to at least two of said force transmitting elements for transmitting forces to said force introducing point.

5. The apparatus of claim 4, wherein said two force transmitting elements are connected to a common connecting point on said lever means.

6. The apparatus of claim 4, wherein each of said two force transmitting elements is connected at a different point on said lever means.

7. The apparatus of claim 1, wherein said force applying means comprise a first force applying element rotatably secured to said structural component, and wherein said further means comprise a second force applying element rigidly secured to said structural component, each of said force applying elements having its respective force introducing point, said lever means comprising a first intermediate lever member operatively connected to the force introducing point of said first force applying element, and a second intermediate lever member operatively connected to said second force applying element.

8. The apparatus of claim 7, wherein said force transmitting means comprise a first force transmitting member and a second force transmitting member, said first intermediate lever member being connected to said first force transmitting member, said second intermediate lever member being connected to said second force transmitting member, said first and second force transmitting members transmitting forces effective in the longitudinal axial direction of the respective force transmitting member, said first and second intermediate lever members transmitting lateral forces.

9. The apparatus of claim 8, wherein said actuating means comprise an actuating member connected in common to said first and second intermediate lever members for transmitting lateral forces.

10. The apparatus of claim 7, wherein one of said first and second intermediate lever members is operatively connected to said actuating means whereas the other intermediate lever member is connected to a fixed point of the apparatus.

11. The apparatus of claim 1, wherein said structural component has a tilting axis, said force applying means comprising two force applying elements, each force applying element having a respective force introducing point, each force introducing point being located substantially on said tilting axis, said lever means comprising an intermediate lever member for each force applying element connected to its respective force introducing point.

* * * * *